US012744304B2

(12) United States Patent
Rosiak et al.

(10) Patent No.: US 12,744,304 B2
(45) Date of Patent: Sep. 22, 2026

(54) AUTOMOTIVE BROADBAND TRANSPARENT ANTENNAS

(71) Applicant: Molex, LLC, Lisle, IL (US)

(72) Inventors: Johannes Rosiak, Burgwedel (DE); Florian Scherbel, Hildesheim (DE)

(73) Assignee: Molex, LLC, Lisle, IL (US)

( * ) Notice: Subject to any disclaimer, the term of this patent is extended or adjusted under 35 U.S.C. 154(b) by 10 days.

(21) Appl. No.: 19/011,651

(22) Filed: Jan. 7, 2025

(65) Prior Publication Data

US 2025/0226566 A1 Jul. 10, 2025

Related U.S. Application Data

(60) Provisional application No. 63/618,998, filed on Jan. 9, 2024.

(51) Int. Cl.
*H01Q 1/22* (2006.01)
*H01Q 1/12* (2006.01)

(52) U.S. Cl.
CPC ......... *H01Q 1/1285* (2013.01); *H01Q 1/2291* (2013.01)

(58) Field of Classification Search
CPC ..... H01Q 1/1271–1285; H01Q 1/2291; H01Q 1/32; H01Q 1/38
See application file for complete search history.

(56) References Cited

U.S. PATENT DOCUMENTS 10,707,554 B2 7/2020 Talty et al.
11,121,470 B2 * 9/2021 Itou .......................... H01Q 1/38

(Continued)

FOREIGN PATENT DOCUMENTS

WO 2023235418 A1 12/2023

OTHER PUBLICATIONS

"LG Unveils Transparent Antenna for Vehicles With Saint-Gobain Sekurit at CES 2024", Retrieved from the Internet URL: https://www.lgnewsroom.com/2023/12/lg-unveils-transparent-antenna-for-vehicles-with-saint-gobain-sekurit-at-ces-2024/, Dec. 18, 2023, 06 pages.

(Continued)

*Primary Examiner* — Hasan Islam

(57) ABSTRACT

Exemplary embodiments are disclosed of automotive broadband transparent antennas. The transparent antennas can be, for example, configured for placement or application directly on vehicle glass or in between layers of vehicle glass, such as glass roofs, windshields, sunroofs, or other vehicle glass structures. In an exemplary embodiment, an antenna system can include a substrate with conductive structure, which can be formed, for example, of metal or other conductive material(s). A radiating area is formed of a conductive mesh or other structure that is windshield transparent or other vehicle glass transparent. The radiating element is in electrical communication with a connector. The connector can be, for example, coaxial cable, coaxial connector, coplanar lines, coaxial, coplanar, waveguide or conductive pad connector, FAKRA connector, HFM® connector, Mate-AX connector, other RF transfer means, or other appropriate connector for a given application. A ground area partially surrounds the radiating area. The ground area is formed of a conductive mesh or structure that is windshield transparent or other vehicle glass transparent.

19 Claims, 13 Drawing Sheets

(56) References Cited

U.S. PATENT DOCUMENTS

| | | | | |
|---|---|---|---|---|
| 12,388,164 | B2 * | 8/2025 | Lee | H01Q 1/1271 |
| 2017/0033433 | A1 | 2/2017 | Winkelmann et al. | |
| 2017/0324142 | A1 * | 11/2017 | Talty | H01Q 1/241 |
| 2023/0163450 | A1 | 5/2023 | Lee et al. | |
| 2026/0031521 | A1 * | 1/2026 | Hang | H01Q 1/1271 |

OTHER PUBLICATIONS

"Transparent Film Antennas", Retrieved from the Internet URL: :https://metamaterial.com/solutions/transparent-antennas/, 2023, 02 pages.

* cited by examiner

AUTOMOTIVE BROADBAND TRANSPARENT ANTENNAS

TECHNICAL FIELD

This disclosure generally relates to automotive broadband transparent antennas, for example, configured for placement or application directly on vehicle glass or in between layers of vehicle glass, such as glass roofs, windshields, sunroofs, or other vehicle viewing structures.

BACKGROUND

Glass roofs are a rising trend in the automotive sector. But as recognized herein, conventional shark fin rooftop antennas may not be suitable for use with glass vehicle roofs. Accordingly, certain individuals would appreciate antenna systems that are applicable to vehicle glass, such as glass roofs, windshields, sunroofs, or other vehicle viewing structures.

SUMMARY

This section provides a general summary of the disclosure and is not a comprehensive disclosure of its full scope or all of its features.

Exemplary embodiments are disclosed of automotive broadband transparent antennas, for example, configured for placement or application directly on vehicle glass or in between layers of vehicle glass, such as glass roofs, windshields, sunroofs, or other vehicle viewing structures. In an exemplary embodiment, an antenna system includes a substrate with conductive structure (e.g., formed of metal or other conductive material(s), etc.). A radiating area is formed of a conductive mesh or other structure that is substantially transparent. The radiating element is in galvanic, capacitive, or inductive communication with a connector (e.g., coaxial cable, coplanar line, waveguide, capacitive coupler, conductive pad connector, coaxial connector such as FAKRA connector (a standardized connector used in the automotive industry), high-speed FAKRA-mini (HFM®) connector, Mate-AX connector, or other radio frequency (RF) transfer techniques, etc.). A ground area partially surrounds the radiating area. The ground area is formed of a conductive mesh or structure that is substantially transparent. The ground area may be partially non-transparent for purposes of better galvanic, capacitive, or inductive connection.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The present application is illustrated by way of example and not limited in the accompanying figures in which like reference numerals indicate similar elements and in which.

Corresponding reference numerals may indicate corresponding (though not necessarily identical) features throughout the several views of the drawings.

DETAILED DESCRIPTION

Figure 1:
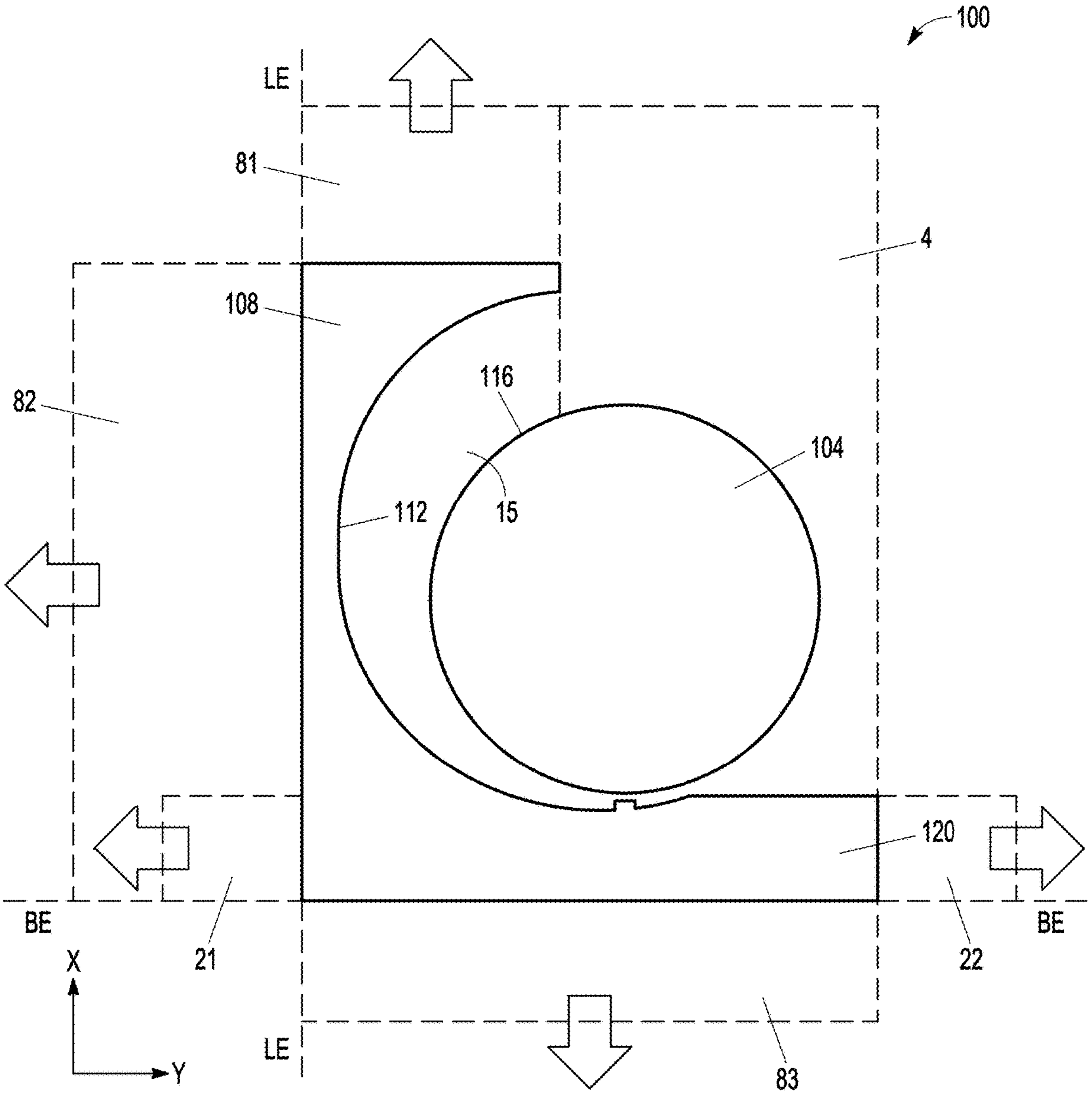
FIG. 1 illustrates an example layout of an antenna structure including a radiating area and a ground area that may be used as an automotive broadband transparent antenna, according to an exemplary embodiment of the present disclosure.

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

Antennas on or in between glass layers can be realized on metalized foils or directly metalized on glass. But as recognized herein, these antennas should be as invisible as possible and include transparent antenna structures, such as shown in, for example but not limited to, FIGS. 2, 4, and 9. These antennas should be invisible or substantially invisible with respect to the unaided human eye. By substantially invisible, it is meant that details that define the component are not visible to the unaided human eye, though it may be apparent that something is presence at the location of the component.

With the rise of 5G technology and later 6G, broadband antennas are needed to cover the entire Frequency Range 1 (FR1) spectrum starting from or below 617 MHz up to or above 5 GHz and more than 8 GHz to support cellular vehicle-to-everything (C-V2X), new Wi-Fi Standards, and non-terrestrial networks (NTN) satellite communication. The state of the art is the integration of complex matching networks, which may be large in size and reduce performance and cost efficiency. After recognizing the above, exemplary embodiments were developed or are disclosed herein of performance, space efficient conformal antenna structures that can be applied on a variety of substrates, such as printed circuit boards (PCBs), foils, glass, plastic, etc.

In exemplary embodiments, the antenna structure covers the complete FR1 frequency spectrum without the need for additional matching components. The antenna structure may be configured to work as a standalone antenna or in combination with the vehicle chassis. Additionally, the antenna structure is preferably space efficient and applicable for transparent antennas, e.g., with various conductive (e.g., metal, etc.) mesh structures, mesh-woven fabrics, other transparent conductive structures and materials, etc. Although the antenna structure can be designed as an FR1 broadband antenna, the antenna structure also can be applied for narrowband services such as WiFi, Bluetooth and C-V2X. By variation of size and geometric relations of the antenna structure, it can be optimized to work for dedicated narrow bands.

In exemplary embodiments, the antenna structure includes a central radiating element or area, which may have a generally circular, oval, rectangle, or leaf shape, or other appropriate shape that may be dependent on the application of the antenna structure. The antenna structure also includes a ground element or area partially surrounding the central radiating element or area. This ground element or area is configured in a way to achieve a good matching in the lower frequency spectrum and wrapped around the central radiating element or area to decrease the size of the overall antenna structure. Matching for the central radiating element or area can be provided by separation of the central radiating element or area from the ground element or area such that a matching circuit is not needed.

In exemplary embodiments, the antenna structure is realizable in a transparent variant based on a combination of a full electrically-conductive (e.g., metalized, etc.) area at the bottom for connection purposes and a transparent top area, which could be placed on or in a visible glass area. The transparent antenna structure may be realized with different thin meshed technologies, such as mesh-woven fabrics, conductive (e.g., metal, etc.) mesh structures, other transparent conductive structures and materials, etc.

With reference to the figures, FIG. 1 illustrates an example layout of an antenna structure 100 that may be used in an automotive broadband transparent antenna according to an exemplary embodiment of the present disclosure. As shown in FIG. 1, the antenna structure 100 includes a radiating area or element 104 and a ground area or element 108. The radiating area or element 104 can be substantially vehicle glass transparent and the ground area or element 108 can be substantially and at least partially vehicle glass transparent. The ground area or element 108 may be partially non-transparent for purposes of better galvanic, capacitive, or inductive connection.

The ground area or element 108 includes an inner perimeter edge 112 spaced apart from and following a shape, contour, or curvature of an outer perimeter edge 116 of the radiating area or element 104. The inner perimeter edge 112 of the ground area or element 108 includes portions above, alongside, and below the radiating area or element 104. The top portion of the ground area or element 108, above the radiating area or element 104, can extend to a position that is less than vertically above the center of radiating area or element 104. In other arrangements, the top portion of the ground area or element 108 can extend to a position that is vertically above or beyond the center of radiating area or element 104.

The ground area or element 108 bent around the center radiating element 104 with a specific aperture and ground portion can make antenna structure 100 broadband and comparably small, which is a key element of the function of the antenna. The specific aperture and ground portion can be defined through simulation or measurement iterations. For implementation with the glass of a car, the aperture geometry and ground prolongation over the center radiating element is dependent on its environment defined by electrical and mechanical properties of the glass and car chassis. The antenna structure 100 can be mirrored or rotated, while maintaining its function.

In this example, the radiating area or element 104 is generally circular. The inner perimeter edge 112 of the ground area or element 108 has a curvature matching the outer perimeter edge 116 of the generally circular radiating area or element 104. The ground area or element 108 includes a generally rectangular portion 120 disposed below the generally circular radiating area or element 104. The ground area or element 108 has a left edge LE and a bottom edge BE, where BE is the bottom edge of generally rectangular portion 120. A bump or notch shown in generally rectangular portion 120 is a connection point for this specific connection type in this example. Other connection techniques can be implemented that do not use such a bump or notch.

FIG. 1 also shows regions 21, 22, 81, 82, and 83 around radiating area or element 104 and ground area or element 108, along with an aperture 15 providing a gap between radiating area or element 104 and ground area or element 108. These regions are shown to reflect that other design considerations can be made for antenna structure 100. Region 82 indicates that a design variation to antenna structure 100 can include freedom to extend the ground area or element 108 in negative y-axis direction from LE without affecting the antenna performance negatively. Regions 81 and 83 indicate that a design variation to antenna structure 100 can include freedom to extend the ground area or element 108 in positive and negative x-axis direction without affecting the antenna performance negatively. In an implementation for a car, a ground prolongation of the ground area or element 108 also can be physically achieved due to the car chassis aligning at LE, which alignment can include galvanic contact or capacitive coupling. Regions 22 and 21 indicate that a design variation to antenna structure 100 can include freedom to extend the ground area in positive and negative y-axis direction without affecting the antenna performance negatively. In an implementation for a car, a ground prolongation of the ground area or element 108 also can be physically achieved due to the car chassis aligning at BE, which alignment can include galvanic contact or capacitive coupling.

The aperture 15 between the radiating area or element 104 and the ground area or element 108 provides a relationship that is one of the key components for a broadband matching. The aperture 15 can be designed via simulation or iterative measurement processes to achieve an optimal antenna performance. Electrical and mechanical changes of the antenna environment such as glass and car chassis may affect the antenna performance. The antenna performance can be optimized to the according environment by tuning the aperture 15. The prolongation of the ground area or element 108 above the center radiating area or element 104 also contributes to the antenna matching. Its dimension is dependent upon the antenna environment.

Region 4 is an area outside antenna structure 100. Region 4 can include glass components of a car to which antenna structure is incorporated. Region 4 is to be kept free from conductive materials.

Figure 10:
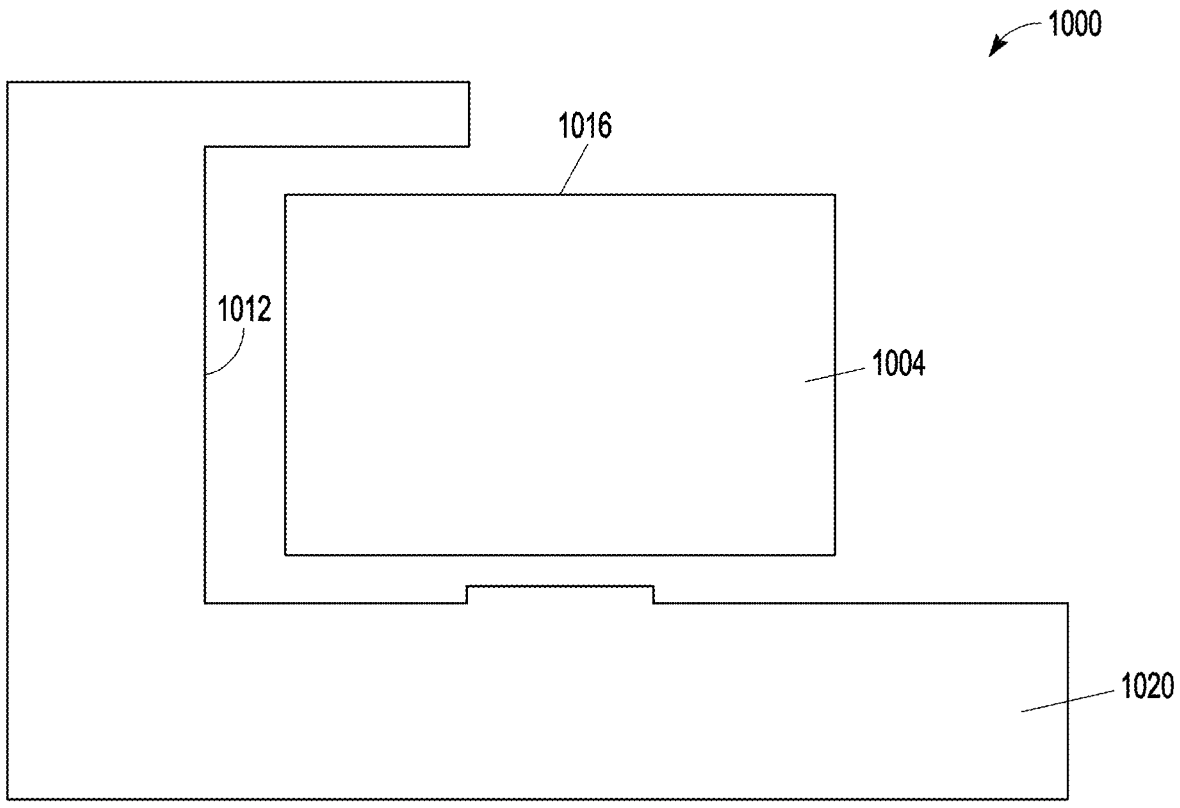
FIG. 10 is a representation of an antenna structure that includes a radiating area or element and a ground area or element for which the radiating area or element is generally rectangle.

Alternatively, the radiating area or element 104 and ground area or element 108 may be configured differently. For example, the radiating element may be generally rectangle. The radiating element may be generally square. The inner perimeter edge of the ground element may have a generally partial rectangular contour matching the outer perimeter edge of the generally rectangle radiating element. The ground element may include a generally rectangular portion disposed below the generally rectangle radiating element. FIG. 10 is a representation of an antenna structure 1000 that includes a radiating area or element 1004 and a ground area or element 1008. In this example, the radiating area or element 1004 is generally rectangle. The radiating area or element 1004 can be generally square. The ground area or element 1008 includes an inner perimeter edge 1012 spaced apart from an outer perimeter edge 1016 of the radiating area or element 1004. The inner perimeter edge 1012 of the ground area or element 1008 includes portions above, alongside, and below the radiating area or element 1004. The inner perimeter edge 1012 of the ground area or element 1008 has a generally rectangular shape matching the outer perimeter edge 1016 of the generally rectangle radiating area or element 1004. The ground area or element 1008 also includes a generally rectangular portion 1020 disposed below the generally rectangle radiating area or element 1004.

Figure 11:
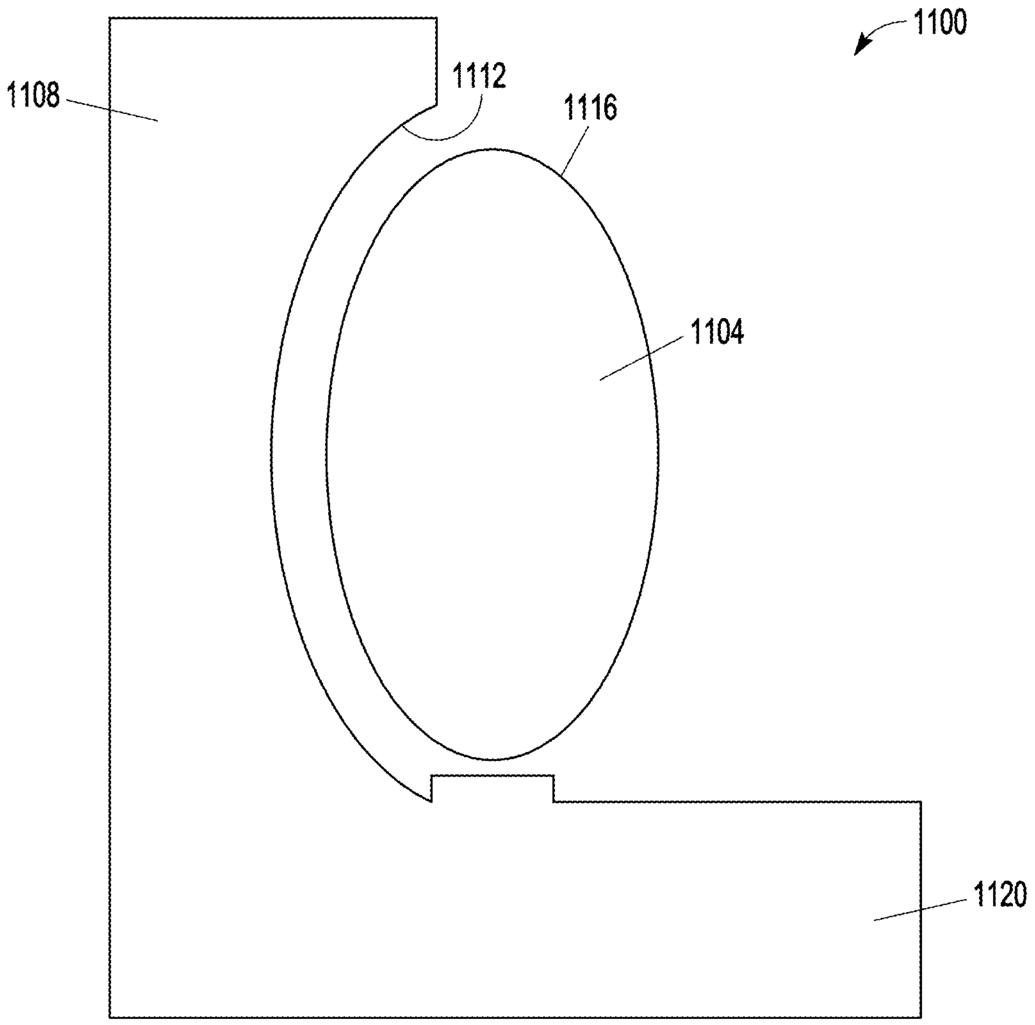
FIG. 11 is a representation of an antenna structure that includes a radiating area or element and a ground area or element for which the radiating area or element is generally oval.

As another example, the radiating element may be generally oval shaped. The inner perimeter edge of the ground element may have a curvature matching the outer perimeter edge of the generally oval radiating element. The ground element may include a generally rectangular portion disposed below the generally oval central radiating element. FIG. 11 is a representation of an antenna structure 1100 that includes a radiating area or element 1104 and a ground area or element 1108. In this example, the radiating area or element 1104 is generally oval. The ground area or element 1108 includes an inner perimeter edge 1112 spaced apart from an outer perimeter edge 1116 of the radiating area or element 1104. The inner perimeter edge 1112 of the ground area or element 1108 includes portions above, alongside, and below the radiating area or element 1104. The inner perimeter edge 1112 of the ground area or element 1108 has a partially oval shape matching the outer perimeter edge 1116 of the generally oval radiating area or element 1104. The ground area or element 1108 also includes a generally rectangular portion 1120 disposed below the generally oval radiating area or element 1104. Though the oval shaped radiating area or element 1104 is shown oriented at 90° from rectangular portion 1120 of ground area or element 1108, other orientations of the oval shaped radiating area or element 1104 can be implemented.

Figure 12:
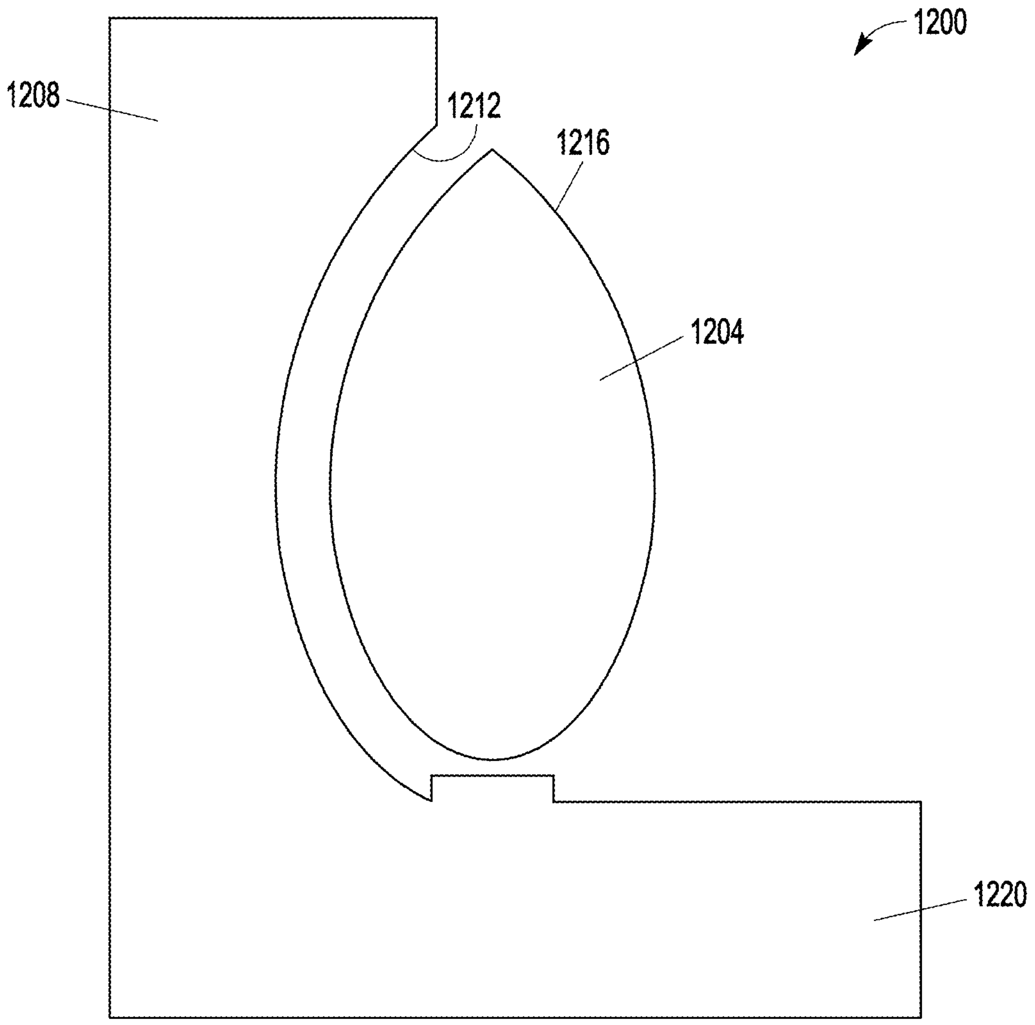
FIG. 12 is a representation of an antenna structure that includes a radiating area or element and a ground area or element for which the radiating area or element is generally leaf shaped.

As another example, the radiating element may be generally leaf shaped. The inner perimeter edge of the ground element may have a curvature matching the outer perimeter edge of the generally leaf shaped radiating element. The ground element may include a generally rectangular portion disposed below the generally leaf shaped central radiating element. FIG. 12 is a representation of an antenna structure 1200 that includes a radiating area or element 1204 and a ground area or element 1208. In this example, the radiating area or element 1204 is generally leaf shaped. The ground area or element 1208 includes an inner perimeter edge 1212 spaced apart from an outer perimeter edge 1216 of the radiating area or element 1204. The inner perimeter edge 1212 of the ground area or element 1208 includes portions above, alongside, and below the radiating area or element 1204. The inner perimeter edge 1212 of the ground area or element 1208 has a partially leaf shape matching the outer perimeter edge 1216 of the generally leaf shaped radiating area or element 1204. The ground area or element 1208 also includes a generally rectangular portion 1220 disposed below the generally leaf shaped radiating area or element 1204.

Matching for the radiating areas or elements 104, 1004, 1104, and 1204 of the antenna structures 100, 1000, 1100, and 1200, respectively, can be provided by the sizes of radiating and ground elements such as the gap geometry and spacing of radiating and ground element without additional matching components. Changing the size and gap portion may optimize the antenna for a dedicated narrow frequency band such as WiFi or Bluetooth. Determining the sizes of radiating and ground elements can be accomplished in the design process for the respective antenna structures, which design process can include simulation analysis. The design process can include determination of appropriate lengths of the ground areas or elements 108, 1008, 1108, and 1208 with respect to their associated radiating elements or areas.

Figure 2:
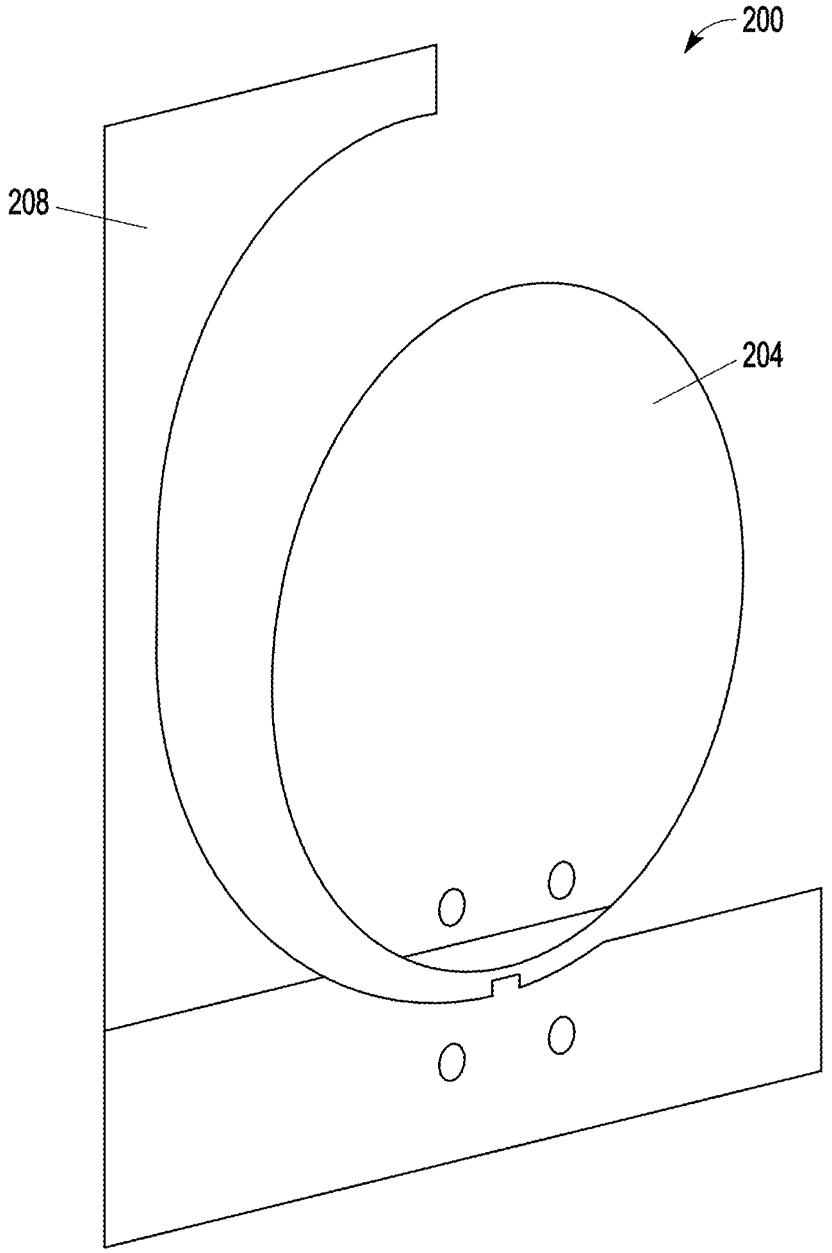
FIG. 2 illustrates a substantially transparent antenna structure that may be used as an automotive broadband transparent antenna and is realized on a metal mesh foil, according to an exemplary embodiment of the present disclosure.

FIG. 2 illustrates a transparent antenna structure 200 that may be used in an automotive broadband transparent antenna according to an exemplary embodiment of the present disclosure. In this exemplary embodiment, the antenna structure 200 includes a radiating area or element 204 and a ground area or element 208 that are formed of conductive structure that is transparent. The conductive structure can be a conductive mesh structure or other appropriate structure that can be implemented in a transparent arrangement. The material of the conductive structure can be metal or other conductive material that can meet the operating specifications for the antenna structure 200. Accordingly, the radiating area or element 204 and the ground area or element 208 may be vehicle glass transparent, windshield transparent, substantially invisible to the unaided human eye, etc. Substantially transparent or invisible can be higher than 80% transparency. By a component being substantially invisible, it is meant that details that define the component are not visible to the unaided human eye, though the overall structure is perceptible as being presence. For example, a mesh conductive structure can be invisible to the unaided human eye due to the use of sufficiently thin materials, though presence of a structure is discernable. The radiating area or element 204 and the ground area or element 208 of antenna structure 200 are "see through" components.

The antenna structure 200 may be used or applied on or in a glass surface of a vehicle. For example, the radiating area or element 204 and the ground area or element 208 may be on or in at least a portion of a vehicle windshield defined by a glass surface. Because the radiating area or element 204 and the ground area or element 208 are windshield transparent or translucent or invisible to an unaided human eye, the radiating area or element 204 and the ground area or element 208 will not obscure or interfere with a vehicle occupant's view through the at least a portion of the windshield defined by the glass surface.

As another example, the radiating area or element 204 and the ground area or element 204 may be on or in at least a portion of a vehicle roof defined by a glass surface. Because the radiating area or element 204 and the ground area or element 208 are invisible to an unaided human eye, the radiating area or element 204 and the ground area or element 208 will not obscure or interfere with a vehicle occupant's view through the at least a portion of the roof defined by the glass surface.

Figure 3:
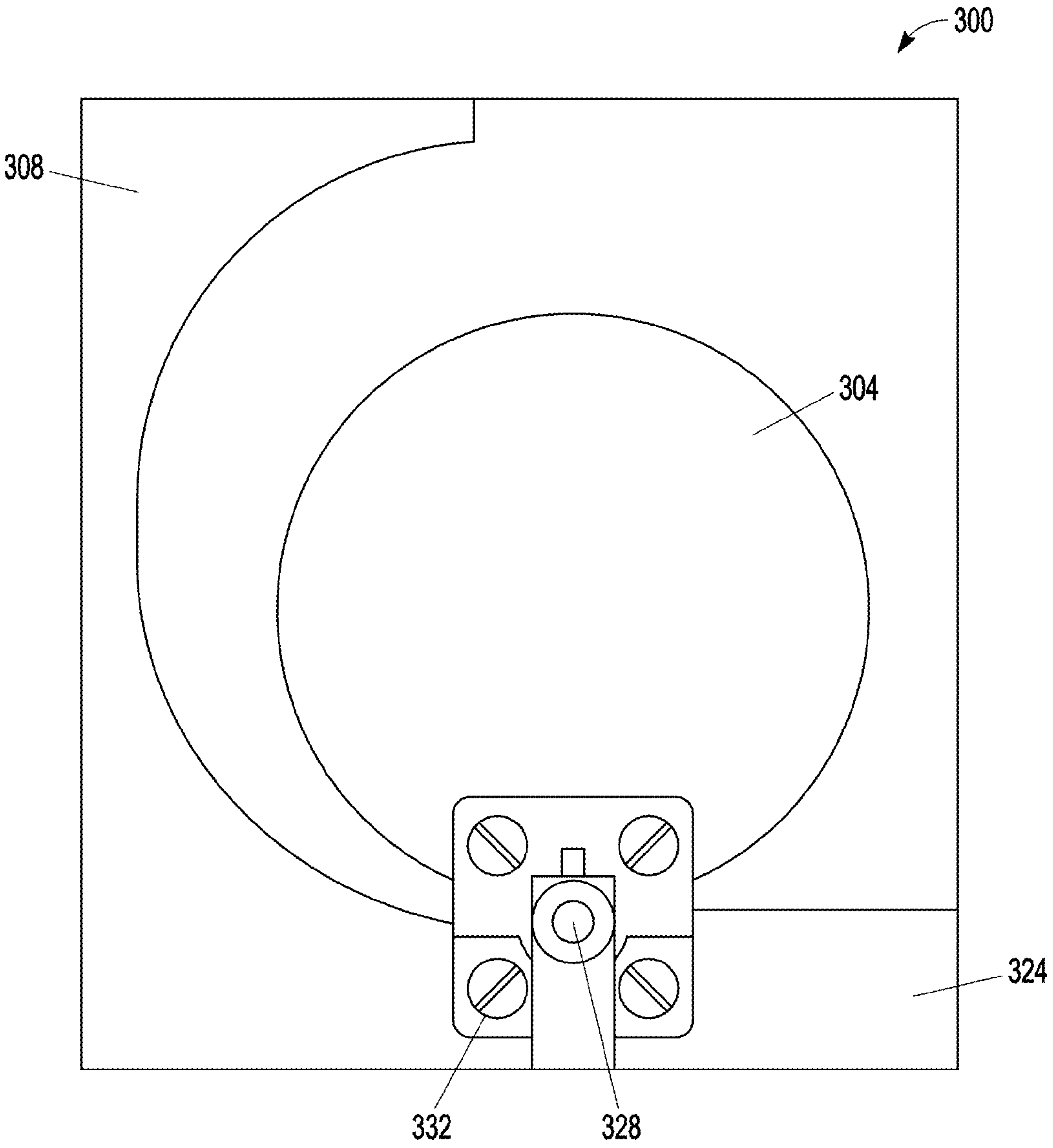
FIG. 3 shows a fully metallized example antenna prototype including the antenna structure shown in FIG. 1 with a coaxial connector attached.

FIG. 3 shows a fully metallized example antenna prototype 300 including a radiating area or element 304 and ground area or element 308 as shown in FIG. 1 with a coaxial connector attached. The antenna prototype 300 includes silver print on a foil substrate 324 and a FAKRA connector 328 or other connector or radio frequency (RF) transfer component. A FAKRA connector is a standardized connector used in the automotive industry. The FAKRA connector 328 is coupled to the radiating area or element 304 and the substrate 324 via mechanical fasteners 332.

In this example, the antenna prototype 300 has dimensions of 100 millimeters (mm) by 90 mm. The dimensions provided in this paragraph and elsewhere are examples only as the antenna structure may be configured differently, e.g., larger or smaller in size, etc. In addition, the FAKRA connector 328 shown in FIG. 3 is but one example type of connector that may be used as other connectors may be used in other exemplary embodiments, such as a coaxial cable, coaxial connector, coplanar lines, coaxial, coplanar, waveguide or conductive pad connector, HFM® connector, Mate-AX connector, other RF transfer techniques, etc. For example, a connection can also be established over coplanar routings or waveguide routings, contact pads, capacitive coupling, or inductive coupling.

Figure 4:
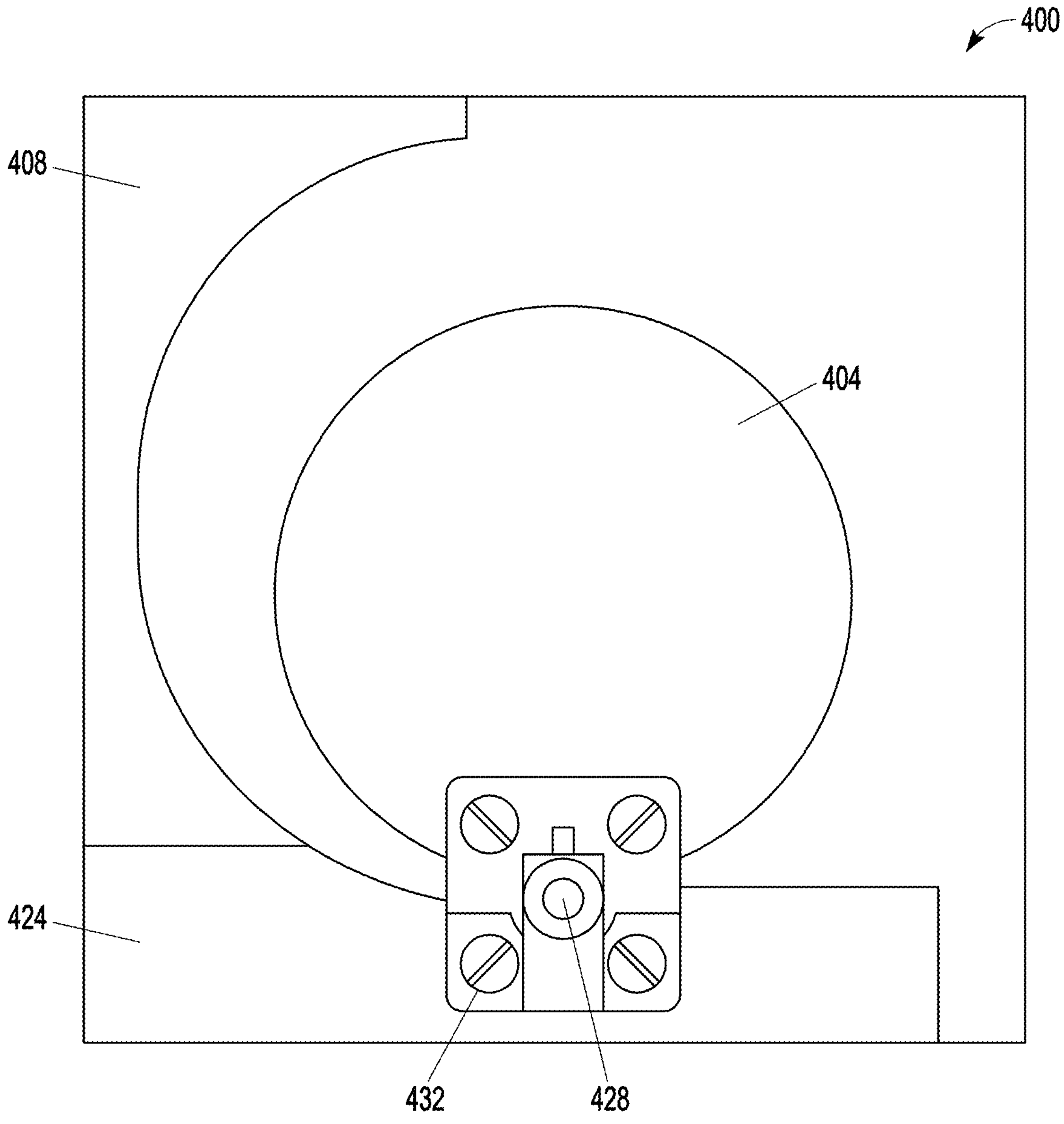
FIG. 4 shows a substantially transparent metal mesh foil example antenna prototype including the antenna structure in FIG. 2 with a coaxial connector attached.

FIG. 4 shows an example antenna prototype 400 including a radiating area or element 404 and ground area or element 408 as shown in FIG. 2. The antenna prototype 400 includes transparent metal mesh on a foil substrate 424 and a FAKRA connector 428. Other connectors or RF transfer components can be used in place of a FAKRA connector. The FAKRA connector 428 is coupled to the radiating area or element 404 and the foil substrate 424 via mechanical fasteners 432. FIG. 4 represents a substantially transparent antenna structure, while FIG. 3 represents a fully metalized (non-transparent) antenna structure for comparison purposes. Both representative antenna structures have the same shape.

In this example, the antenna prototype 400 has dimensions of 100 mm by 90 mm. The dimensions provided in this paragraph and elsewhere are examples only as the antenna structure may be configured differently, e.g., larger or smaller in size, etc. In addition, the FAKRA connector 428 shown in FIG. 4 is but one example type of connector that may be used as other connectors may be used in other exemplary embodiments, such as a coaxial cable, coaxial connector, coplanar lines, coaxial, coplanar, waveguide or conductive pad connector, HFM® connector, Mate-AX connector, other RF transfer mechanisms, etc. For example, a connection can also be established over coplanar routings, waveguide routings, contact pads, capacitive couplings, or inductive couplings.

Figure 5:
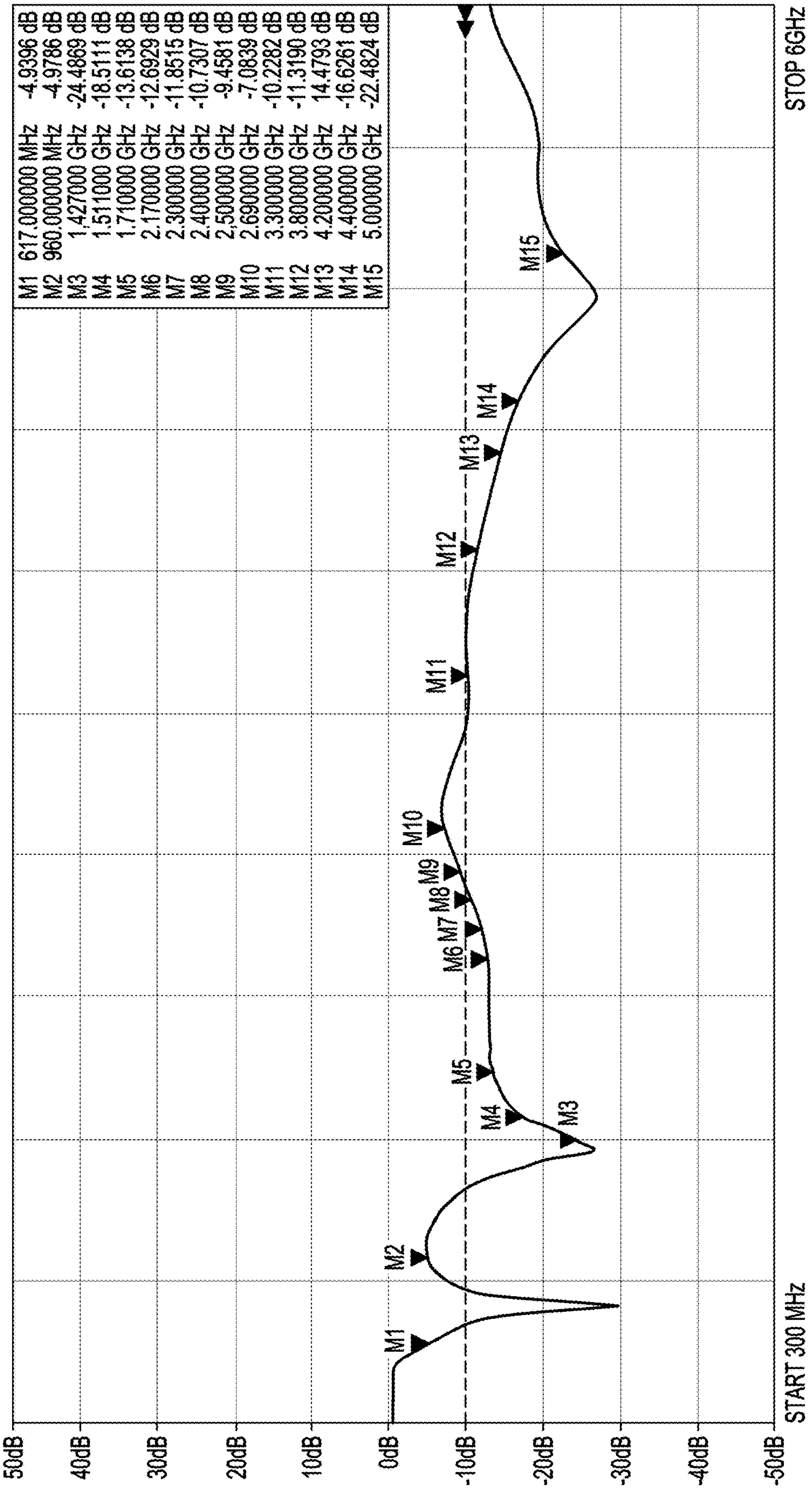
FIG. 5 includes a line graph of return loss in decibels (dB) versus frequency for the stand-alone antenna prototype shown in FIG. 4.

FIG. 5 includes a line graph of return loss in decibels (dB) versus frequency for the antenna prototype 400 shown in FIG. 4. Generally, FIG. 5 shows that the antenna prototype 400 performed well with regard to return loss, e.g., less than negative 10 decibels for most the of the upper FR1 cellular bands from 1427 MHz to 5 GHz and less then negative 10 decibels at the cellular low band center frequency from 617 MHz to 960 MHz.

Figure 6:
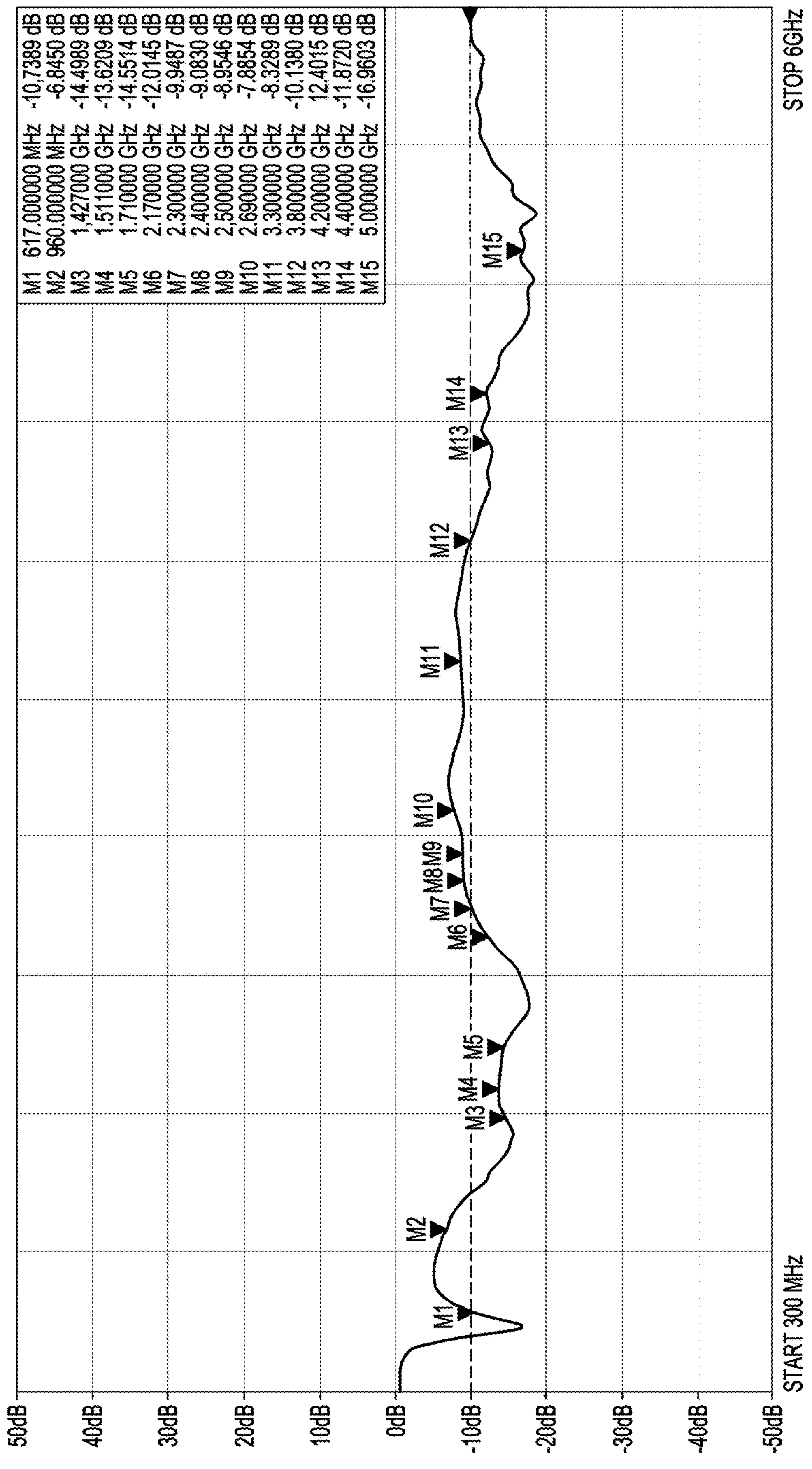
FIG. 6 includes a line graph of return loss versus frequency for the antenna prototype shown in FIG. 4 when attached on a glass surface.

FIG. 6 includes a line graph of return loss versus frequency for the antenna prototype shown 400 in FIG. 4 when attached on a glass surface. Generally, FIG. 6 shows that the antenna prototype 400 performed well with regard to return loss, e.g., less than negative 6.8 decibels for the frequency range from 617 MHz to 5 GHZ, etc. In RF terms, a lower return loss is better. A return loss below −10 dB means that more than 90% of the inserted energy is radiated, which is a desired goal.

Figure 7:
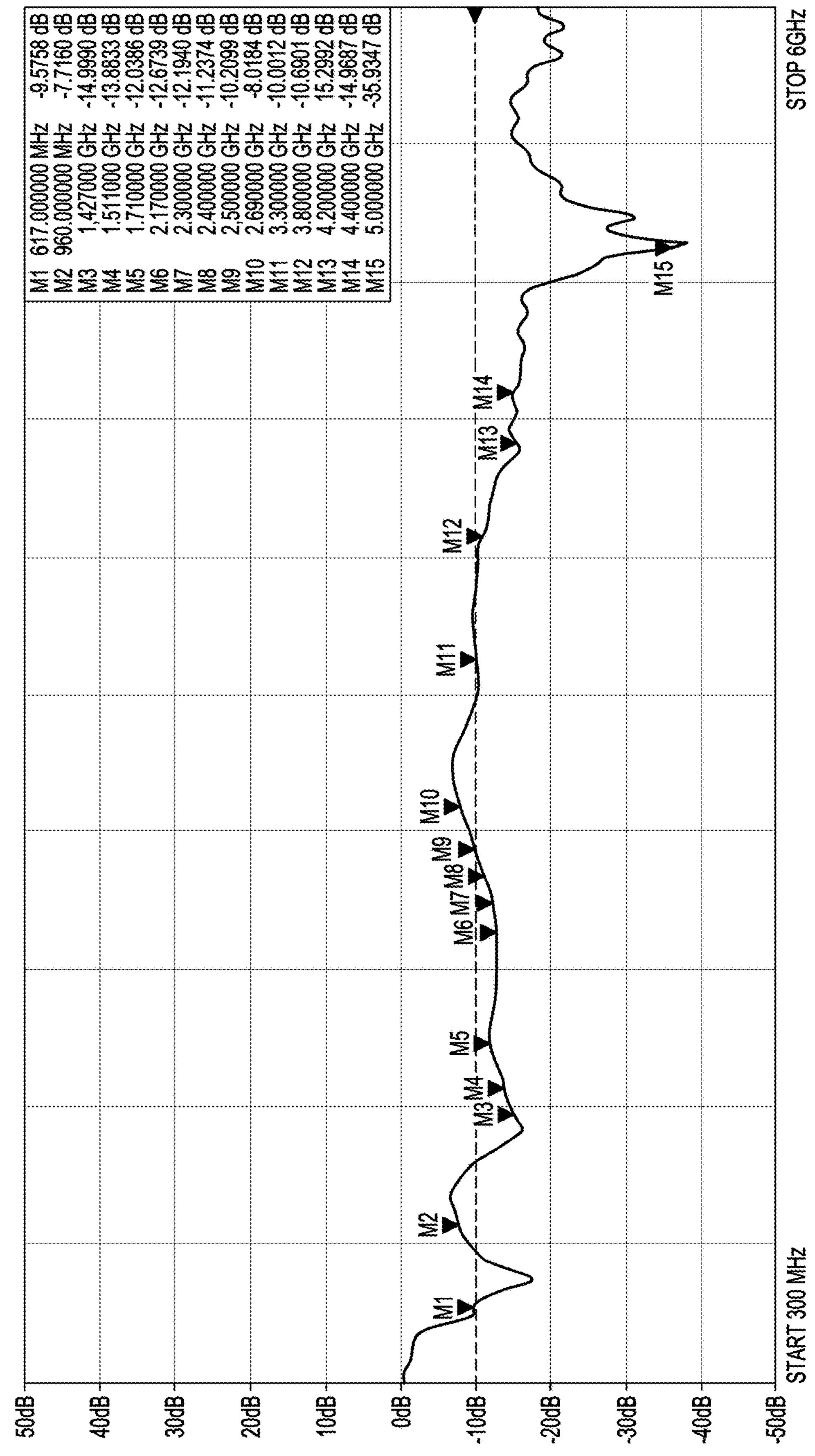
FIG. 7 includes a line graph of return loss versus frequency for the antenna prototype shown in FIG. 4 when attached on a glass surface with a 300 mm extended bottom ground area.

FIG. 7 includes a line graph of return loss versus frequency for the antenna prototype 400 shown in FIG. 4 when attached on a glass surface with a 300 mm extended ground area. By extending the ground area, the return loss for low frequencies can be improved. The extended ground area can replicate a case like a car chassis being an extension at the bottom of the antenna. Generally, FIG. 7 shows that the antenna prototype 400 performed well with regard to return loss, e.g., less than negative 7.7 decibels for the frequency range from 617 MHz to 5 GHZ, etc.

Figure 8:
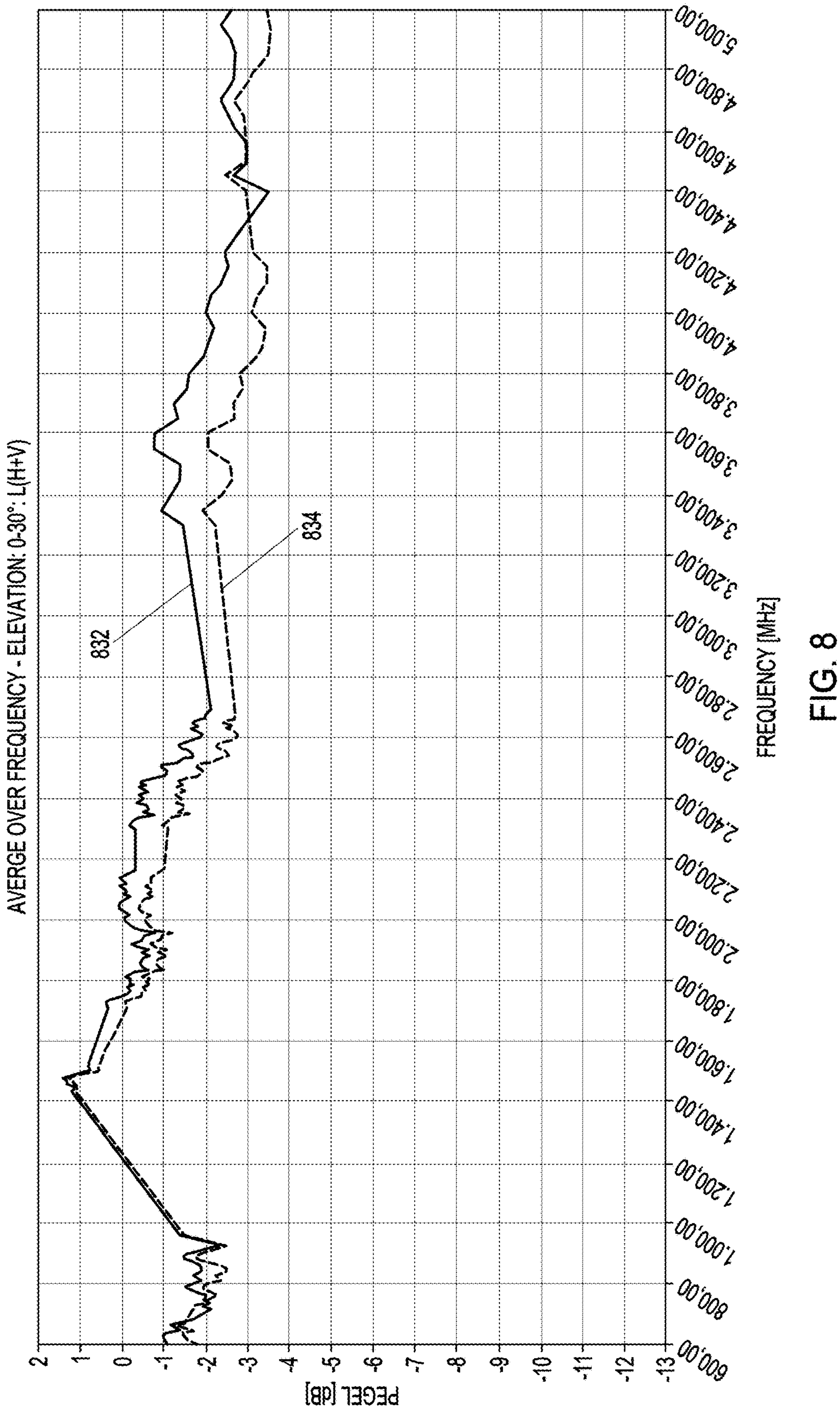
FIG. 8 includes a line graph of average realized gain in decibels (dB) versus frequency in megahertz (MHz) at 0° to 30° elevation and polarization linear (vertical+horizontal) for a fully metallized antenna prototype shown in FIG. 3 compared to an antenna prototype realized on a substantially transparent metal mesh foil shown in FIG. 4.

FIG. 8 includes a line graph of average realized gain in decibels (dB) versus frequency in megahertz (MHz) at 0° to 30° elevation and polarization linear (vertical+horizontal) for an antenna prototype 300 shown in FIG. 3 (curve 832) compared to the antenna prototype 400 shown in FIG. 4 (curve 834) realized on a transparent metal mesh foil. For each frequency point of interest, the average over phi (0° to) 360° and the elevation of interest (0° to) 30° was created and plotted. Generally, FIG. 8 shows that the transparent antenna prototype 400 had comparable or similar gain performance as the fully metallized antenna prototype 300.

Figure 9:
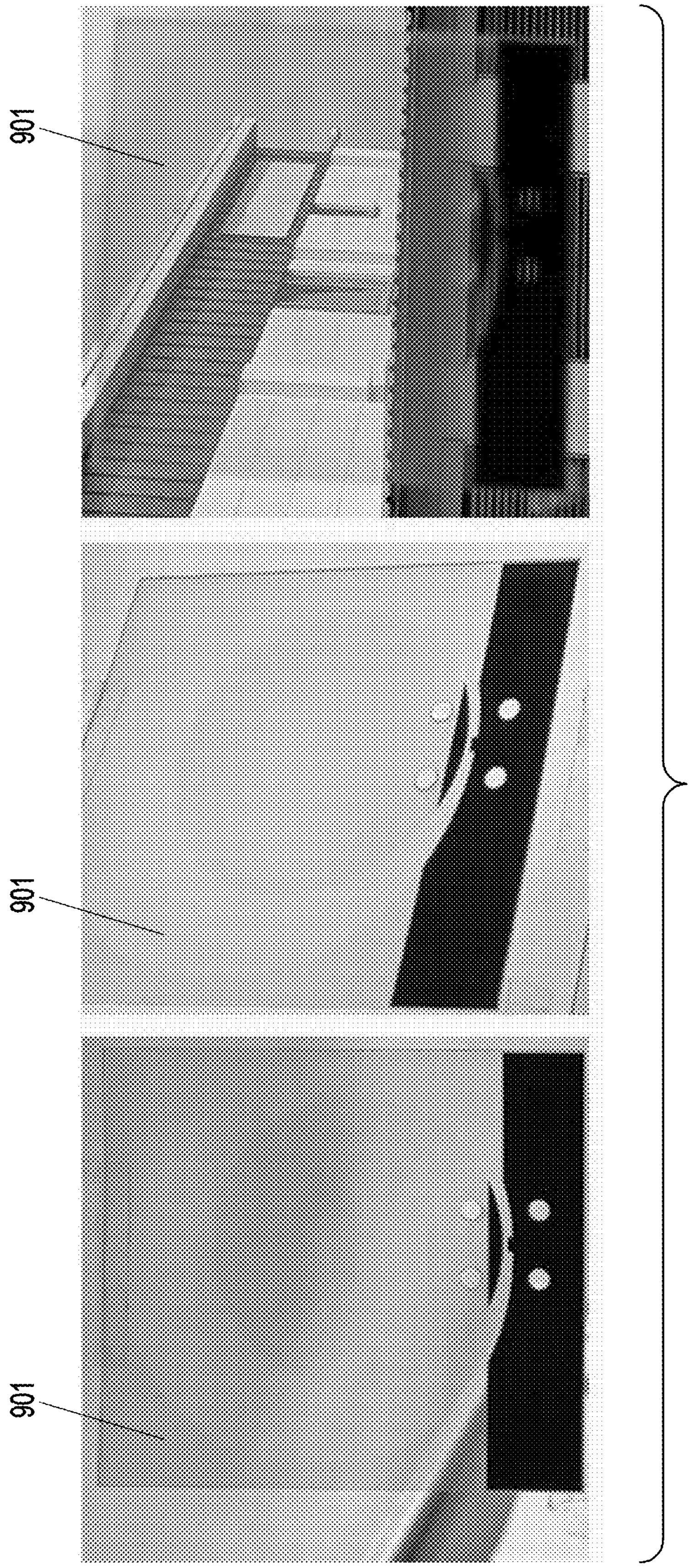
FIG. 9 shows the transparency achievable with the disclosed automotive broadband transparent antennas according to exemplary embodiments of the present disclosure.

FIG. 9 shows the transparency achievable with a disclosed automotive broadband transparent antenna according to exemplary embodiments of the present disclosure. An antenna structure 901 is mounted on a glass surface. As shown in FIG. 9, the antenna structure 901 is transparent and the details of the antenna structure 901 are substantially invisible to the unaided human eye, though it is clear that a structure is discernible at the locations of antenna structures 901. The view of a structure and sky above the structure are not obscured by antenna structure 901.

Figure 13:
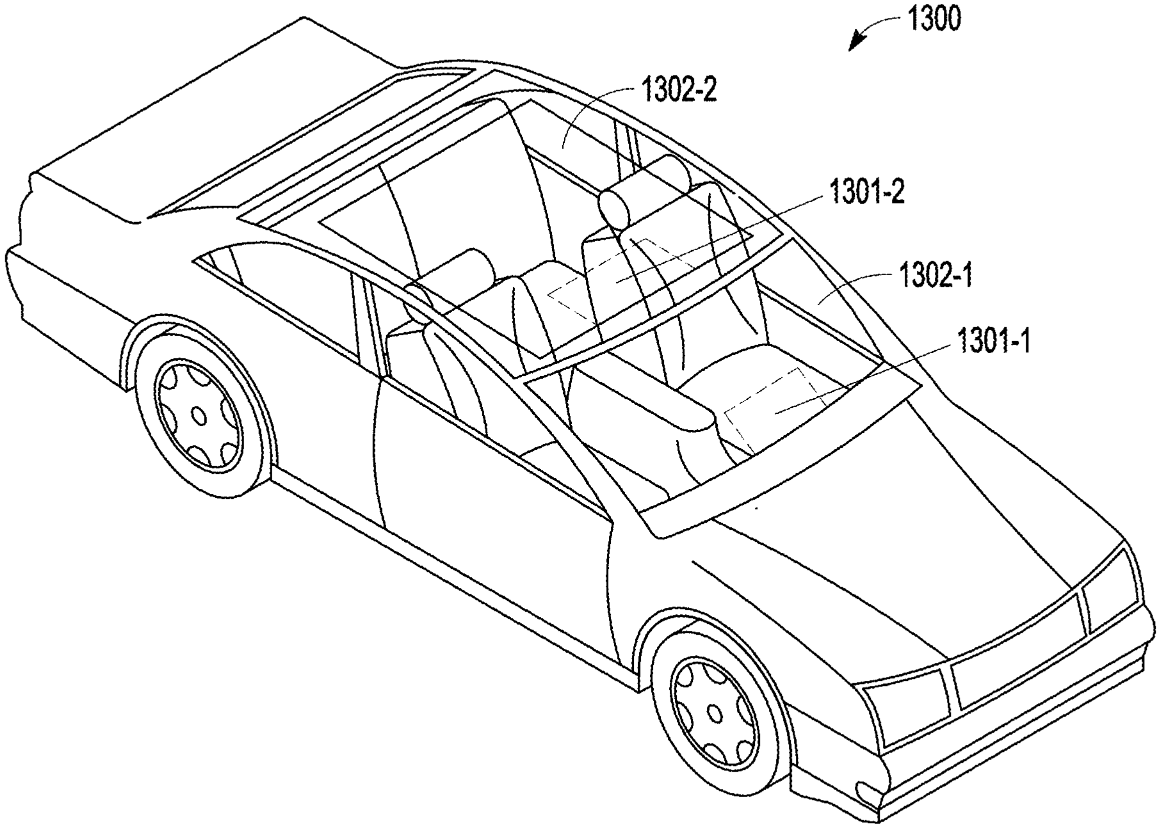
FIG. 13 illustrates a vehicle 1300 having an antenna system on the vehicle windshield or vehicle roof, according to various embodiments.

FIG. 13 illustrates a vehicle 1300 having an antenna system on a vehicle windshield or vehicle roof. Vehicle 1300 can have a windshield 1302-1 with an antenna structure 1301-1 located on or in glass of windshield 1302-1. Vehicle 1300 can have a glass roof 1302-2 with an antenna structure 1301-2 located on or in glass roof 1302-2. Vehicle 1300 can include both antenna structure 1301-1 and antenna structure 1301-2. Antenna structure 1301-1 or antenna structure 1301-2 can be implemented with a radiating element and a ground element similar to antenna structures taught herein. Antenna structure 1301-1 and antenna structure 1301-2 can be located at any position on the windshield 1302-1 or glass roof 1302-2, respectively, including at locations other than the edge of the windshield 1302-1 and the edge of the glass roof 1302-2, since these antenna structures can also perform as standalone antennas without additional ground area such as the chassis of vehicle 1300. The antenna implementations are not limited to the windshield or glass roof. The antenna implementations can be positioned on any other glass or transparent surface of the vehicle 1300.

The following are example embodiments of apparatus and systems, in accordance with the teachings herein.

An example antenna system 1 can comprise: a substrate with conductive structure; a radiating area formed of a first conductive structure that is substantially vehicle glass transparent; a connector in galvanic, capacitive, or inductive communication with the radiating area; and a ground area that partially surrounds the radiating area, the ground area formed of a second conductive structure that is substantially and at least partially vehicle glass transparent. The first conductive or the second conductive structure can be conductive mesh structures. The ground area can extend vertically along one side of the radiating area and, at the top of the antenna, the grounding area can extend partially over the top of the radiating area. In some embodiments, the grounding area can extend less than halfway across the top of the radiating area. In other embodiments the ground area can extend halfway or more across the top of the radiating area.

An example antenna system 2 can include features of example antenna system 1 and can include the ground area extending partially over top of the radiating area.

An example antenna system 3 can include features of example antenna system 1 and can include the example antenna system being configured to cover a frequency range from about 617 MHz to about 8 GHz.

An example antenna system 4 can include features of example antenna system 3 and can include the example antenna system being configured to cover the frequency range from about 617 MHz to about 8 GHz with matching provided by sizes of radiating and ground areas including gap geometry or spacing of radiating and ground areas without additional matching components.

An example antenna system 5 can include features of example antenna system 1 can include the example antenna system being configured to cover a frequency range from about 617 MHz to at least about 5 GHz.

An example antenna system 6 can include features of example antenna system 5 and can include the example antenna system being configured to cover the frequency range from about 617 MHz to at least about 5 GHz with matching provided by sizes of radiating and ground areas including gap geometry or spacing of radiating and ground areas without additional matching components.

An example antenna system 7 can include features of any of the preceding example antenna systems and can include the radiating area and the ground area being formed of a conductive structure configured to be sufficiently thin to be windshield transparent and invisible to an unaided human eye when applied on or in the windshield. The conductive structure can be a conductive mesh structure.

An example antenna system 8 can include features of any of the preceding example antenna systems and can include the radiating area and the ground area being formed of a conductive structure configured to be sufficiently thin to be transparent and invisible to an unaided human eye when applied on or in a glass surface.

An example antenna system 9 can include features of any of the preceding example antenna systems and can include the substrate comprising a conductive foil substrate, a glass substrate, a plastic substrate, or a printed circuit board (PCB).

An example antenna system 10 can include features of any of the preceding example antenna systems and can include the ground area having an inner perimeter edge spaced apart from and following a shape, contour, or curvature of an outer perimeter edge of the radiating area such that the inner perimeter edge of the ground area includes portions above, alongside, and below the radiating area.

An example antenna system 11 can include features of example antenna system 10 and can include the radiating area being generally circular; the inner perimeter edge of the ground area having a curvature matching the outer perimeter edge of the generally circular radiating area; and the ground area having a generally rectangular portion disposed below the generally circular radiating area.

An example antenna system 12 can include features of example antenna system 10 and can include the radiating area being generally a rectangle; the inner perimeter edge of the ground area having a generally partial rectangular contour matching the outer perimeter edge of the generally rectangle radiating area; and the ground area having a generally rectangular portion disposed below the generally rectangle radiating area.

An example antenna system 13 can include features of example antenna system 10 and can include the radiating area being generally oval shaped; the inner perimeter edge of the ground area having a curvature matching the outer perimeter edge of the generally oval radiating area; and the ground area having a generally rectangular portion disposed below the generally oval radiating area.

An example antenna system 14 can include features of any of the preceding example antenna systems and can include the radiating area being generally circular, oval, rectangle, or leaf shaped.

An example antenna system 15 can include features of any of the preceding example antenna systems and can include the substrate, the radiating area, and the ground area defining a broadband conformal antenna configured to cover a frequency range from about 617 MHz up to at least 5 GHz with or without the need for matching components.

An example antenna system 16 can include features of any of the preceding example antenna systems and can include the antenna system being configured to be operable for supporting C-V2X, WiFi, and Bluetooth.

An example antenna system 17 can include features of any of the preceding example antenna systems and can include the connector comprising a coaxial cable, coaxial connector, coplanar lines, coaxial, coplanar, waveguide or conductive pad connector, FAKRA connector, HFM® connector, Mate-AX connector, or other RF transfer means.

An example vehicle 1 can include a glass surface and the antenna system of any one of the preceding example antenna systems 1-16 and can include the radiating area and the ground area being on or in the glass surface of the vehicle.

An example vehicle 2 can include features of example vehicle 1 and can include the glass surface being defined by layers of glass; and the radiating area and the ground area being in between the layers of glass.

An example vehicle 3 can include features of example vehicle 1 or 2 and can include the glass surface defining at least a portion of a windshield of the vehicle; the radiating area and the ground area are on or in the at least a portion of the windshield defined by the glass surface; and the radiating area and the ground area are windshield transparent or substantially invisible to an unaided human eye such that the radiating area and the ground area do not obscure with a vehicle occupant's view through the at least a portion of the windshield defined by the glass surface.

An example vehicle 4 can include features of example vehicle 1 or 2 and can include the glass surface defining at least a portion of a roof of the vehicle; the radiating area and the ground area being on or in the at least a portion of the roof defined by the glass surface; and the radiating area and the ground area are substantially invisible to an unaided human eye such that the radiating area and the ground area do not obscure with a vehicle occupant's view through the at least a portion of the roof defined by the glass surface.

A example broadband conformal antenna 1 can comprise: a central radiating element; and a ground element disposed at least partially around the central radiating element, the ground element including an inner perimeter edge spaced apart from and following a shape, contour, or curvature of an outer perimeter edge of the central radiating element such that the inner perimeter edge of the ground element includes portions above, alongside, and below the central radiating element, with the broadband conformal antenna configured to cover a frequency range from about 617 MHz up to at least 5 GHz with or without the need for additional matching components.

An example broadband conformal antenna 2 can include features of broadband conformal antenna 1 and can include the broadband conformal antenna being configured to cover a frequency range from about 617 MHz up to at least 8 GHz.

An example broadband conformal antenna 3 can include features of example broadband conformal antenna 2 and can include the example broadband conformal antenna being configured to cover the frequency range from about 617 MHz up to at least 8 GHz with matching provided by sizes of central radiating element and ground element including gap geometry or spacing of central radiating and ground areas without additional matching components.

An example broadband conformal antenna 4 can include features of any of the preceding example broadband conformal antennas and can include the broadband conformal antenna being operable for supporting C-V2X, WiFi, and Bluetooth.

An example broadband conformal antenna 5 can include features of any of the preceding example broadband conformal antennas 1 to 4 and can include: the central radiating element being generally circular; the inner perimeter edge of the ground element having a curvature matching the outer perimeter edge of the generally circular central radiating element; and the ground element having a generally rectangular portion disposed below the generally circular central radiating element.

An example broadband conformal antenna 6 can include features of any of the preceding example broadband conformal antennas 1 to 4 and can include: the central radiating element being generally rectangle; the inner perimeter edge of the ground element having a generally partial rectangular contour matching the outer perimeter edge of the generally rectangle central radiating element; and the ground element having a generally rectangular portion disposed below the generally rectangle central radiating element.

An example broadband conformal antenna 7 can include features of any of the preceding example broadband conformal antennas 1 to 4 and can include the central radiating element being generally oval shaped; the inner perimeter edge of the ground element having a curvature matching the outer perimeter edge of the generally oval central radiating element; and the ground element includes a generally rectangular portion disposed below the generally oval central radiating element.

An example broadband conformal antenna 8 can include features of any of the preceding example broadband conformal antenna 1 to 4 and can include the central radiating element being generally circular, oval, rectangle, or leaf shaped.

An example broadband conformal antenna 9 can include features of any of the preceding example broadband conformal antennas and can include the central radiating element and the ground element being formed of a conductive structure that is windshield transparent or substantially invisible to an unaided human eye when applied on or in the windshield.

An example antenna system 17 including the broadband conformal antenna of any one of example broadband conformal antennas 1 to 9 and can include a substrate formed of conductive material(s); and a connector in electrical communication with the central radiating element.

An example antenna system 18 can include features of example antenna system 17 and can include the substrate comprising a conductive foil substrate, a glass substrate, a plastic substrate, or a printed circuit board (PCB); or the connector comprising a coaxial cable, coaxial connector, coplanar lines, coaxial, coplanar, waveguide or conductive pad connector, FAKRA connector, HFM® connector, Mate-AX connector, or other RF transfer means.

A example vehicle 5 can comprise a glass surface and the broadband conformal antenna of any one of example broadband conformal antennas 1 to 9 or example antenna systems 17 or 18, wherein the central radiating element and the ground element are on or in the glass surface of the vehicle.

An example vehicle 6 can include features of example vehicle 5 and can include the glass surface being defined by layers of glass; and the central radiating element and the ground element being in between the layers of glass.

An example vehicle 7 can include features of example vehicle 5 or 6 and can include the glass surface defining at least a portion of a windshield of the vehicle; the central radiating element and the ground element being on or in the at least a portion of the windshield defined by the glass surface; and the central radiating element and the ground element being windshield transparent or substantially invisible to an unaided human eye such that the central radiating element and the ground element do not obscure with a vehicle occupant's view through the at least a portion of the windshield defined by the glass surface.

An example vehicle 8 can include features of example vehicle 5 or 6 and can include the glass surface defining at least a portion of a roof of the vehicle; the central radiating element and the ground element being on or in the at least a portion of the roof defined by the glass surface; and the central radiating element and the ground element being invisible to a substantially unaided human eye such that the central radiating element and the ground element do not obscure with a vehicle occupant's view through the at least a portion of the roof defined by the glass surface.

Exemplary embodiments disclosed herein can provide one or more (but not necessarily any or all) of the following advantages, including that the antenna structure does not necessarily require additional ground prolongation and yet shows a broadband characteristic making it space efficient and suitable for a broad field of environments. Due to the broadband nature of the antenna structure, no additional matching components are required, which allows the realization of non-complicated connector solutions, minimizes or reduces losses caused by components, and allows an antenna structure realization on a broad field of substrates such as PCBs, foils, plastic covers, etc.

The disclosure provided herein describes features in terms of exemplary embodiments thereof. Numerous other embodiments, modifications and variations within the scope and spirit of the appended claims will occur to persons of ordinary skill in the art from a study of this disclosure.

We claim:

1. An antenna system comprising:

a substrate with a first conductive structure;

a radiating area formed of a second conductive structure that is substantially vehicle glass transparent;

a connector in galvanic, capacitive, or inductive communication with the radiating area and also coupled to the substrate; and a ground area that partially surrounds the radiating area, the ground area formed of a third conductive structure that is substantially and at least partially vehicle glass transparent, wherein an inner perimeter edge of the ground area has a shape matching a shape of an outer perimeter edge of the radiating area that is generally circular, oval, rectangular, or leaf shaped.

2. The antenna system of claim 1, wherein the ground area extends partially over top of the radiating area.

3. The antenna system of claim 1, wherein the antenna system is configured to cover a frequency range from about 617 MHz to about 8 GHz.

4. The antenna system of claim 3, wherein the antenna system is configured to cover the frequency range from about 617 MHz to about 8 GHz with matching provided by sizes of radiating and ground areas including gap geometry of radiating and ground areas without additional matching components.

5. The antenna system of claim 1, wherein the antenna system is configured to cover a frequency range from about 617 MHz to at least about 5 GHz.

6. The antenna system of claim 5, wherein the antenna system is configured to cover the frequency range from about 617 MHz to at least about 5 GHz with matching provided by sizes of radiating and ground areas including spacing of radiating and ground areas without additional matching components.

7. The antenna system of claim 1, wherein the radiating area and the ground area are formed of a conductive structure configured to be sufficiently thin to be windshield transparent and substantially invisible to an unaided human eye when applied on or in a windshield or configured to be sufficiently thin to be transparent and substantially invisible to an unaided human eye when applied on or in a glass surface.

8. The antenna system of claim 1, wherein the substrate comprises a conductive foil substrate, a glass substrate, a plastic substrate, or a printed circuit board (PCB).

9. The antenna system of claim 1, wherein the inner perimeter edge of the ground area includes portions above, alongside, and below the radiating area.

10. The antenna system of claim 9, wherein:

the radiating area is generally circular;

the inner perimeter edge of the ground area has a curvature matching the outer perimeter edge of the generally circular radiating area; and the ground area includes a generally rectangular portion disposed below the generally circular radiating area.

11. The antenna system of claim 9, wherein:

the radiating area is generally rectangle;

the inner perimeter edge of the ground area has a generally partial rectangular contour matching the outer perimeter edge of the generally rectangle radiating area; and the ground area includes a generally rectangular portion disposed below the generally rectangle radiating area.

12. The antenna system of claim 9, wherein:

the radiating area is generally oval shaped;

the inner perimeter edge of the ground area has a curvature matching the outer perimeter edge of the generally oval radiating area; and the ground area includes a generally rectangular portion disposed below the generally oval radiating area.

13. The antenna system of claim 1, wherein the substrate, the radiating area, and the ground area define a broadband conformal antenna configured to cover a frequency range from about 617 MHz up to at least 5 GHz and matching of the radiating area is provided by sizes of radiating and ground areas including gap geometry or spacing of radiating and ground areas.

14. The antenna system of claim 1, wherein the antenna system is configured to be operable for supporting cellular vehicle-to-everything (C-V2X), WiFi, or Bluetooth.

15. The antenna system of claim 1, wherein the connector comprises a coaxial cable, coaxial connector, coplanar lines, coaxial, coplanar, waveguide or conductive pad connector, FAKRA connector, high-speed FAKRA-mini (HFM®) connector, Mate-AX connector, or other RF transfer means.

16. A vehicle comprising:

a glass surface; and an antenna system, the antenna system including:

a substrate with a first conductive structure;

a radiating area formed of a second conductive structure that is substantially vehicle glass transparent;

a connector in galvanic, capacitive, or inductive communication with the radiating area and also coupled to the substrate; and a ground area that partially surrounds the radiating area, the ground area formed of a third conductive structure that is substantially and at least partially vehicle glass transparent, the radiating area and the ground area structured on or in the glass surface of the vehicle, wherein an inner perimeter edge of the ground area has a shape matching a shape of an outer perimeter edge of the radiating area that is generally circular, oval, rectangular, or leaf shaped.

17. The vehicle of claim 16, wherein:

the glass surface is defined by layers of glass; and the radiating area and the ground area are between the layers of glass.

18. The vehicle of claim 16, wherein:

the glass surface defines at least a portion of a windshield of the vehicle;

the radiating area and the ground area are on or in the at least a portion of the windshield defined by the glass surface; and the radiating area and the ground area are windshield transparent or substantially invisible to an unaided human eye such that the radiating area and the ground area do not obscure a vehicle occupant's view through the at least a portion of the windshield defined by the glass surface.

19. The vehicle of claim 16, wherein:

the glass surface defines at least a portion of a roof of the vehicle;

the radiating area and the ground area are on or in the at least a portion of the roof defined by the glass surface; and the radiating area and the ground area are sufficiently invisible to an unaided human eye such that the radiating area and the ground area do not obscure a vehicle occupant's view through the at least a portion of the roof defined by the glass surface.

* * * * *